United States Patent

Mehra et al.

(10) Patent No.: US 7,197,530 B2
(45) Date of Patent: Mar. 27, 2007

(54) SYSTEM AND METHOD FOR PLUGGABLE URL PATTERN MATCHING FOR SERVLETS AND APPLICATION SERVERS

(75) Inventors: Vinod Mehra, Alameda, CA (US); Mark Spotswood, San Francisco, CA (US)

(73) Assignee: Bea Systems, Inc., San Jose, CA (US)

( * ) Notice: Subject to any disclaimer, the term of this patent is extended or adjusted under 35 U.S.C. 154(b) by 794 days.

(21) Appl. No.: 10/345,913

(22) Filed: Jan. 16, 2003

(65) Prior Publication Data

US 2003/0158895 A1  Aug. 21, 2003

Related U.S. Application Data

(60) Provisional application No. 60/349,456, filed on Jan. 18, 2002.

(51) Int. Cl.
*G06F 15/16* (2006.01)

(52) U.S. Cl. .................. 709/202; 709/203; 719/328

(58) Field of Classification Search ............... 709/203, 709/202; 717/100, 114; 715/700; 719/328
See application file for complete search history.

(56) References Cited

U.S. PATENT DOCUMENTS

| | | | | |
|---|---|---|---|---|
| 5,928,323 A * | 7/1999 | Gosling et al. | ............. | 709/203 |
| 5,991,306 A | 11/1999 | Burns et al. | | |
| 6,047,323 A | 4/2000 | Krause | | |
| 6,128,655 A | 10/2000 | Fields et al. | | |
| 6,167,522 A | 12/2000 | Lee et al. | ............. | 713/201 |
| 6,256,031 B1 | 7/2001 | Meijer et al. | ............. | 345/357 |
| 6,289,393 B1 | 9/2001 | Phillips et al. | | |
| 6,323,881 B1 | 11/2001 | Broulik et al. | ............. | 345/744 |
| 6,345,386 B1 | 2/2002 | Delo et al. | | |
| 6,418,554 B1 | 7/2002 | Delo et al. | | |
| 6,480,860 B1 * | 11/2002 | Monday | ............. | 707/102 |
| 6,505,242 B2 * | 1/2003 | Holland et al. | ............. | 709/219 |
| 6,546,554 B1 | 4/2003 | Schmidt et al. | | |
| 6,625,624 B1 * | 9/2003 | Chen et al. | ............. | 707/204 |
| 6,757,708 B1 | 6/2004 | Craig et al. | | |
| 2002/0133603 A1 * | 9/2002 | Mitomo et al. | ............. | 709/229 |
| 2003/0140115 A1 * | 7/2003 | Mehra | ............. | 709/217 |

FOREIGN PATENT DOCUMENTS

KR   2001008276 A   2/2001

OTHER PUBLICATIONS

Fielding, RFC 2616, Hypertext Transfer Protocol—HTTP/1.1, Jun. 1999, Table of Contents (pp. 1-6), Section 14 (pp. 1-39).

* cited by examiner

*Primary Examiner*—Saleh Najjar
*Assistant Examiner*—Thuong Nguyen
(74) *Attorney, Agent, or Firm*—Fliesler Meyer LLP

(57) ABSTRACT

The invention provides a system and method for providing pluggable pattern matching for servlets. This feature allows application servers that incorporate the invention to support non-J2EE pattern matching schemes in their http request resolution. The pluggable pattern matching feature is targeted primarily at customers who want to implement custom URL matching patterns. Since this feature is not J2EE compliant, some other form of configuration is necessary. In one embodiment an XML file (weblogic.xml) is used to configure the new pattern matching utilities. By modifying the settings in the weblogic.xml file, users are able to plug their own custom pattern matching utility classes into the weblogic server.

19 Claims, 3 Drawing Sheets

SYSTEM AND METHOD FOR PLUGGABLE URL PATTERN MATCHING FOR SERVLETS AND APPLICATION SERVERS

CLAIM OF PRIORITY

This application claims priority from provisional application "SYSTEM AND METHOD FOR PLUGGABLE URL PATTERN MATCHING FOR SERVLETS AND APPLICATION SERVERS" Application No. 60/349,456 filed Jan. 18, 2002, and which application is incorporated herein by reference.

CROSS-REFERENCES

This application is related to U.S. Provisional Patent Application No. 60/349,443, "SYSTEM AND METHOD FOR URL RESPONSE CACHING AND FILTERING IN SERVLETS AND APPLICATION SERVERS" filed Jan. 18, 2002 and United States Provisional Patent Application No. 60/349,466, entitled "SYSTEM AND METHOD FOR USING VIRTUAL DIRECTORIES TO SERVICE URL REQUESTS IN APPLICATION SERVERS", filed Jan. 18, 2002, both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and particularly to a system and method for providing pluggable pattern matching for servlets.

BACKGROUND

An ever-increasing number of e-commerce providers or e-businesses rely on application server technology as the lifeblood of their business. Application servers form a proven foundation for supporting e-commerce applications, providing the presentation, business and information-access logic, security and management services, and underlying infrastructure required for highly scalable and mission-critical software applications. Increasingly, the demands of today's modern businesses require support for a new breed of Web and wireless applications, helping to meet the needs of increasingly sophisticated customers.

One such application server, WebLogic Server, from BEA Systems, Inc. San Jose, Calif., is based on an implementation of the Java 2 Enterprise Edition (J2EE) specification. WebLogic Server is used as the backbone for many of today's most sophisticated e-business applications, playing an integral role in a tightly integrated, comprehensive infrastructure that delivers commerce, personalization, campaign management, enterprise integration, workflow management, and business-to-business collaboration. From Web and wireless clients to Windows, Unix, and mainframe servers, WebLogic Server manages all of the underlying complexities of a business' e-commerce applications, allowing the organization to focus instead on delivering new and innovative products and services.

A typical application server, including WebLogic Server, supports a variety of clients, including Web browsers, and wireless devices. On the server side, WebLogic Server supports leading Unix, Linux, Windows, and mainframe operating systems. On the back-end, WebLogic Server integrates with relational databases, messages queues, and legacy systems. WebLogic Server provides support for features such as Servlets, Java Server Pages (JSPs), Enterprise JavaBeans (EJBs), Java Messaging Service (JMS), to provide access to standard network protocols, database, and messaging systems. When developing applications, developers can create, assemble, and deploy components that use these services.

In a typical deployment, WebLogic Server also includes a Web server for hosting static content and dynamic J2EE Web applications. J2EE Web applications typically include a collection of HTML/XML pages, Java Server Pages, Servlets, Java classes, applets, images, multimedia files, and other file types. WebLogic Server may also be integrated with other Web servers such as Apache, Microsoft IIS, or Netscape Web servers. Web components usually provide the presentation logic for browser-based or wireless applications, while EJB components encapsulate business objects and processes.

Many Web servers, such as those discussed above, were originally designed as simple engines for transmitting physical files from a host machine or server to the user's client or Web browser. This file-oriented legacy still remains, although many Web servers such as Apache allow files to be sent to the browser unmodified or instead parsed by content handlers to transform before sending them on to the browser. For example, when Apache receives a request, the URI is passed through any URI translation handlers that may be installed, transforming it into a file path. Next, Apache attempts to divide the file path into two parts: a "filename" part which usually (but not always) corresponds to a physical file on the host's file system, and an "additional path information" part corresponding to additional stuff that follows the filename. Apache divides the path using a very simple-minded algorithm. It steps through the path components from left to right until it finds something that doesn't correspond to a directory on the host machine. The part of the path up to and including this component becomes the filename, and everything that's left over becomes the additional path information.

Many currently available application servers, including the WebLogic Server product, employ pattern matching rules defined by the corresponding J2EE specification. However, the J2EE pattern matching is very limiting. It allows only three kind of patterns:

1. path based and exact, for example: "/foo/bar";
2. path based with wild-card, for example: "/foo/bar/*"; and,
3. extension based, for example: "*.blah".

The following scenario gives an example of the j2ee pattern matching limitation: Suppose one has *.blah mapped to a given servlet, and a request comes in to http://foo.com/abcd/bar.blah/efg, then the server will not be able to resolve the request correctly. It will however be able to resolve http://foo.com/abcd/bar.blah correctly. Conversely, Apache can properly interpret this extension (seeing the request as meaning http://foo.com/bar.blah, together with an /efg extension modifier).

This difference in interpretation leads to unpredictable results, particularly when legacy systems are included in the network. Sophisticated server customers (i.e. application developers) have expressed an interest in an application server or Web server product that provides a more powerful approach to pattern matching, including (although not necessarily limited to) Apache-style pattern matching. This is a valuable feature not only for migrating legacy Web sites, but also because the e.g. Apache scheme is more flexible in some situations. Accordingly, what is needed is a mechanism for providing application and Web servers with the ability to specify or customize their file and file type pattern matching features to suit the particular needs of the Web application environment.

SUMMARY

The invention provides a system and method for providing pluggable pattern matching for servlets. This feature allows application servers that incorporate the invention to support non-J2EE pattern matching schemes in their http request resolution. The pluggable pattern matching feature is targeted primarily at customers who want to implement custom URL matching patterns. Since this feature is not J2EE compliant, some other form of configuration is necessary. In one embodiment an XML file (weblogic.xml) is used to configure the new pattern matching utilities. By modifying the settings in the weblogic.xml file, users are able to plug their own custom pattern matching utility classes into the weblogic server.

In accordance with one embodiment the invention comprises a system for allowing pluggable pattern matching in an application server environment, comprising: a web server component for receiving http requests and passing said requests to the application server; a pattern matching interface for use in matching said http requests to a desired pattern for use with the application server; and, a configuration file for identifying a particular pattern matching interface to be used.

In another embodiment the invention comprises a method of allowing pluggable pattern matching in an application server environment, comprising the steps of: receiving http requests at a web server component for communication to the application server; identifying in a configuration file a particular pattern matching interface to be used; matching, using said particular pattern matching interface, said http requests; and, communicating said matched http requests to the application server.

DETAILED DESCRIPTION

The invention provides a system and method for providing pluggable pattern matching for servlets. This feature allows application servers that incorporate the invention to support non-J2EE pattern matching schemes in their http (hypertext transfer protocol) request resolution. The pluggable pattern matching feature is targeted primarily at customers who want to implement custom URL matching patterns. Since this feature is not J2EE compliant, some other form of configuration is necessary. In one embodiment an XML file (weblogic.xml) is used to configure the new pattern matching utilities. By modifying the settings in the weblogic.xml file, users are able to plug their own custom pattern matching utility classes into the weblogic server.

Figure 1:
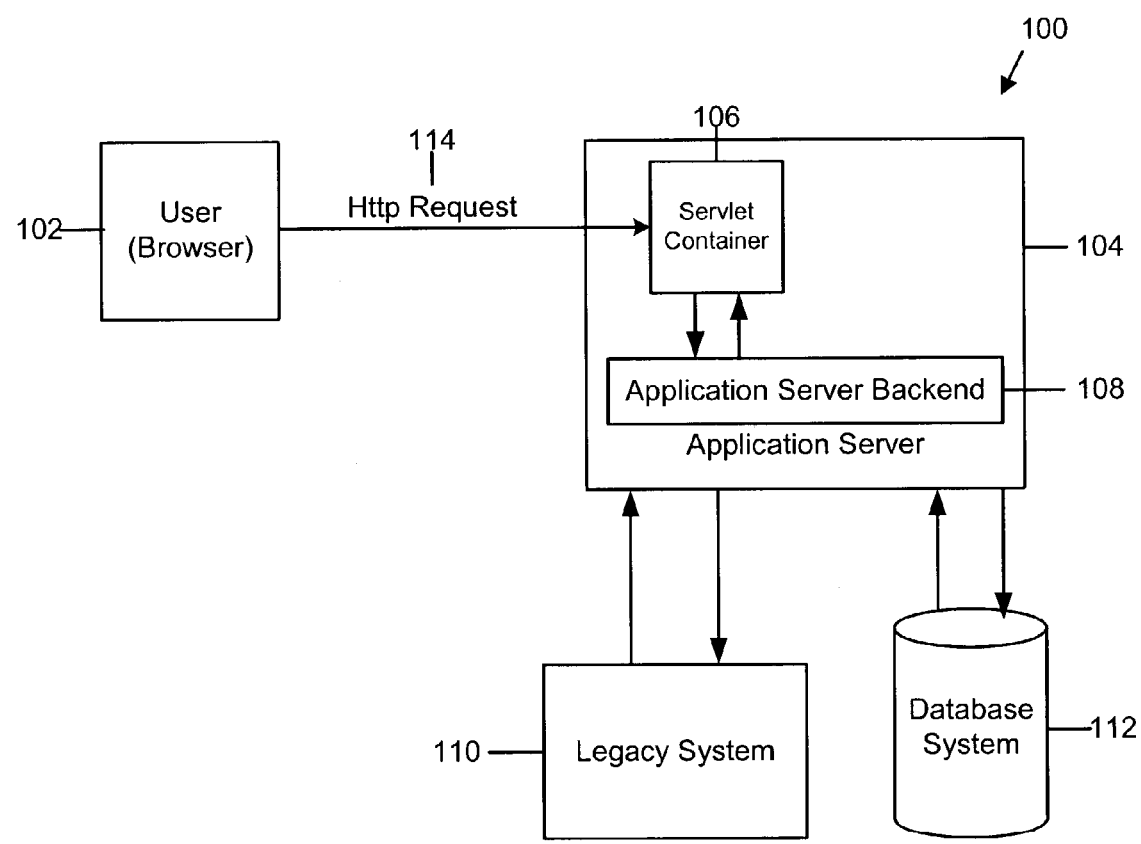
FIG. 1 shows a plan of a typical browser/application server interaction.

FIG. 1 shows a plan of a typical browser/application server interaction that does not use pluggable pattern matching. As shown in FIG. 1, a user 102 (using a Web browser, a WAP device, or an equivalent application) accesses an application server 104, such as WebLogic Server, via a servlet container 106. The http request may arrive via a Web server, via a load balancer, or even directly to the server, depending on the particular implementation. The typical protocol used is the hypertext transfer protocol or http, and the browser normally communicates with the application server via a series of http requests 114. The Web server in turn communicates via the application server back end 108 with, for example, legacy systems 110 and database systems 112. Since the application server's servlet container is somewhat 'hard-coded' to respond to a certain set of requests (notably those compliant with or matching the J2EE specification), it cannot be easily modified if the developer decides to implement, e.g. an Apache-like or custom form of request matching. The only option in this case is to provide a hard-coded workaround to take into account those custom matchings.

Figure 2:
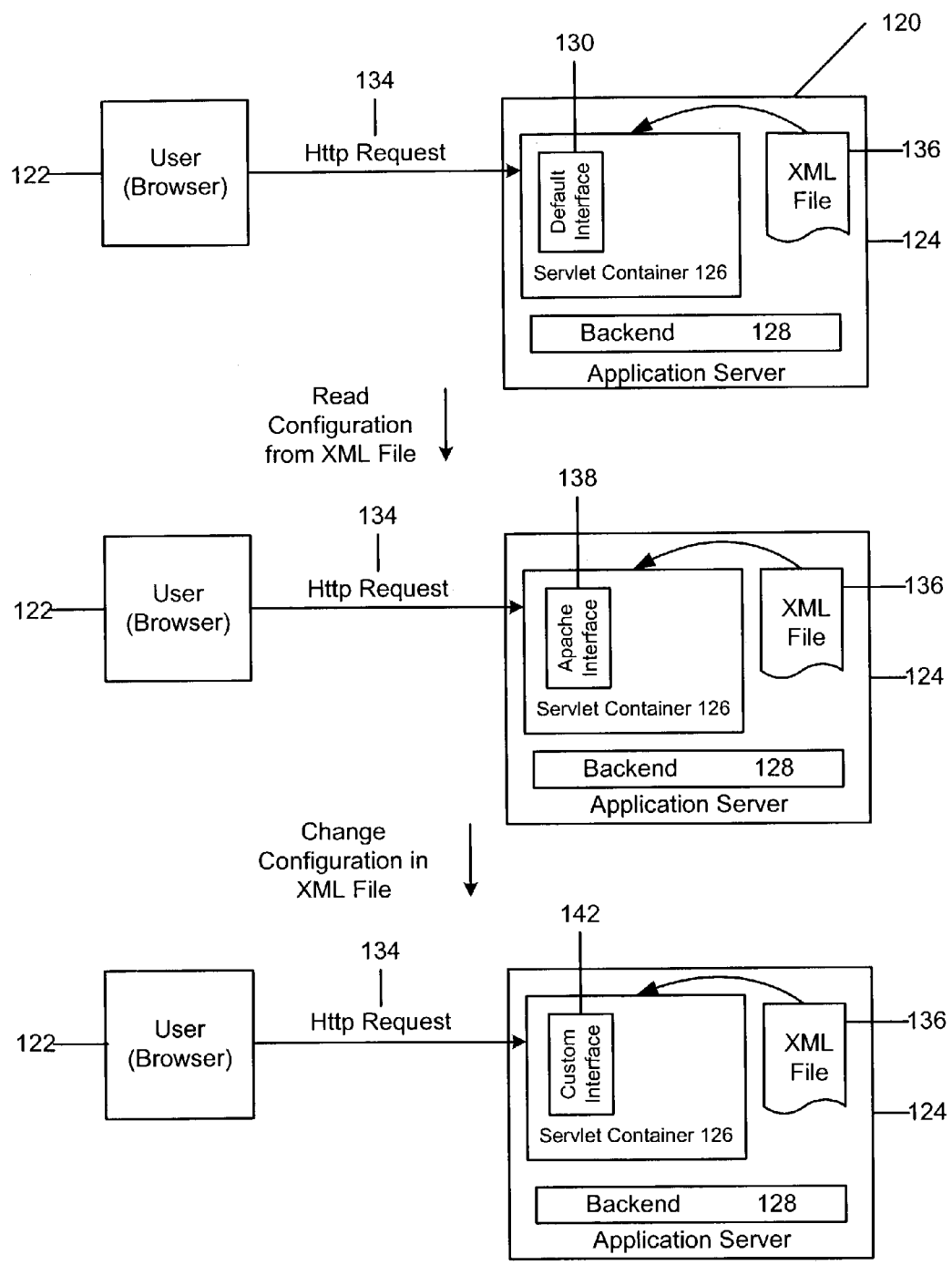
FIG. 2 shows a plan of a pluggable pattern matching web server in accordance with an embodiment of the invention.

FIG. 2 shows a plan of a pluggable pattern matching server and servlet container in accordance with the an embodiment of the present invention. The simple hard-coded servlet container is replaced with a servlet container that allows for the plugin of different request pattern-matching utilities. The effect is to modify the application server request interface to suit the particular needs of the developer. Since this modification is non-J2EE compliant the system must include a mechanism for indicating which pattern matcher to use. In accordance with one embodiment this configuration is via a weblogic.xml configuration file. A URLMatchMapSection of the weblogic.xml file is used to specify the desired class to be used for url pattern matching. By default the weblogic server uses a weblogic.servlet.utils.URLMatchMap, which is based on J2EE standards, but by altering the url-match-map the developer can override the behavior of the Web server interface, or write a custom url pattern matcher.

Particularly, as shown in the example of FIG. 2, the user, using for example a browser application 122 communicates with an application server 124 via a series of http requests 134. The application server includes a servlet container 126 for communicating with the user via http, and typically a backend process 128 for communicating with other applications, servers, and legacy systems. The application server also includes a configuration file, in one embodiment an XML file 136, for configuring non-J2EE features and resources. At run-time the configuration file is parsed to find the names of essential features that are then plugged into the application server. One of these features is a setting that indicates the pattern matching utility to be used. In a first instance, the system may find no relevant entry in the configuration file 136, in which case a default interface 130 is used. If the configuration file is then edited or changed, for example to specify an Apache style interface, then the appropriate Apache pattern matcher 138 is plugged in at run-time. Similarly, if the configuration file is again modified to specify a custom interface, then that custom pattern matcher 142 is plugged in. In this way, modifying the configuration file allows for quick and easy changing of the pattern matcher used.

CONFIGURATION FILE (Weblogic.xml) SYNTAX

The syntax of an entry in the configuration file is as follows:
<!ELEMENT url-match-map (map-class)>
<!--
The fully qualified classname of the pattern matcher.
-->

For Example,
<url-match-map>
weblogic.servlet.utils.SimpleApacheURLMatchMap
</url-match-map>

Software Interfaces

Any new class developed for performing the pattern matching must implement a standard mapping interface, such as the (weblogic.servlet.utils.URLMapping interface shown below:
Package weblogic.servlet.utils;
public interface URLMapping {
public void put(String pattern, Object value);
public Object get(String uri);
public void remove(String pattern)
public void setDefault(Object defaultObject);
public Object getDefault( );
public void setCaseInsensitive(boolean ci);
public boolean isCaseInsensitive( );
public int size( );
public Object[ ] values( );
public String[ ] keys( );
}

The default implementation is URLMatchMap. Another implementation that is shipped with the weblogic product is weblogic.servlet.utils. SimpleApacheURLMatchMap, which performs non-J2EE Apache-style extension matching, can be plugged in by the customer if required. If the ApacheURLMatchMap mapping is used, then when *.jws is mapped to JWSServlet then http://foo.com/bar.jws/baz will be resolved to: JWSServlet with pathinfo=baz.

Figure 3:
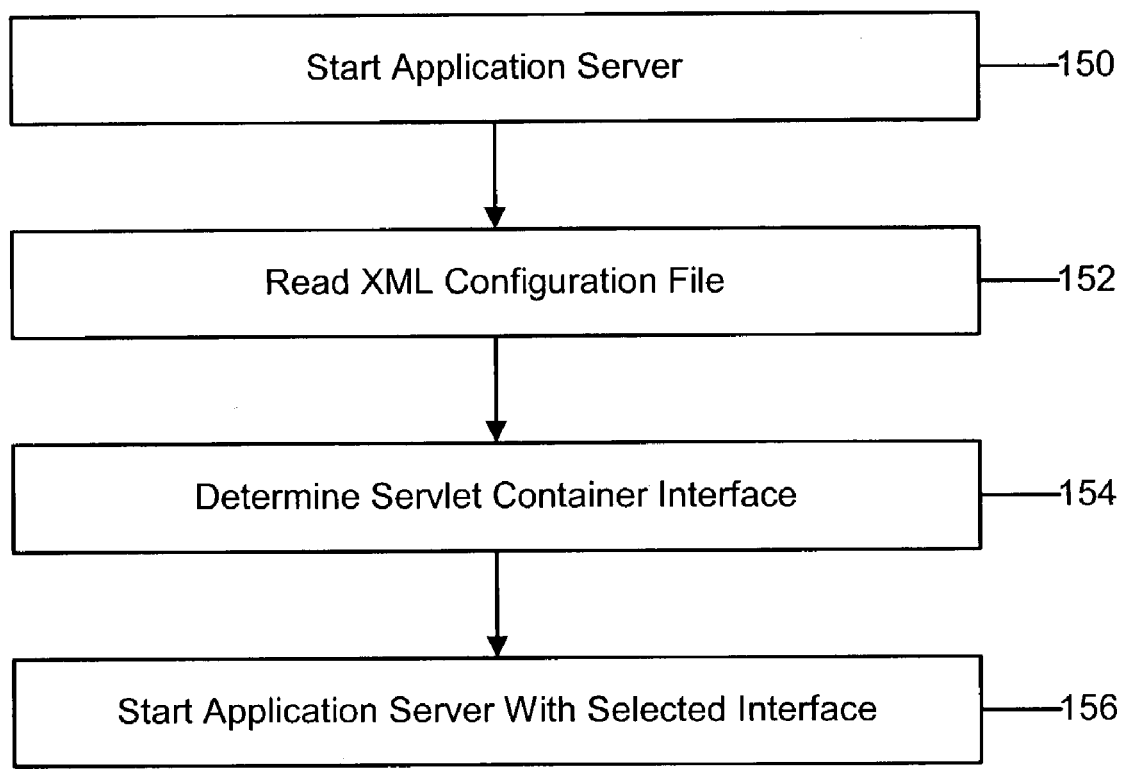
FIG. 3 shows a flowchart of a method for pluggable pattern matching in accordance with an embodiment of the invention.

FIG. 3 shows a flowchart of a method for pluggable pattern matching in accordance with the invention. As can be seen in FIG. 3, the application server is started in step 150. In step 152 the configuration file is read and searched for an entry defining the pattern matcher to be used. An appropriate servlet container interface is determined in step 154. The application server is then started in step 156 with the appropriate pattern matching interface.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that although the Apache style pattern matcher is described above, many other types of pattern matching schemes can be written by the developer beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for allowing pluggable pattern matching in an application server environment, comprising:
an application server including a servlet container for receiving http request;
a plurality of pattern matching interfaces on the application server;
an XML configuration file for indicating a particular pattern matching interface from the plurality of pattern matching interfaces, wherein the XML configuration file includes a setting that defines the classname of the particular pattern matching interface; and
wherein the XML configuration file setting is parsed at run-time to determine the particular pattern matching interface, wherein the particular pattern matching interface is plugged into the servlet container, which then uses the particular pattern matching interface to match the http requests to a desired pattern, and wherein matched http requests are communicated to the application server.

2. The system of claim 1 wherein said http requests are received from a user operating a web browser application.

3. The system of claim 1 wherein said http requests are received from a software application.

4. The system of claim 1 wherein the configuration file is an extensible markup language file containing a plurality of entries defining the configuration of the application server environment.

5. The system of claim 4 wherein the particular pattern matching interface is specified as an entry in the extensible markup language file.

6. The system of claim 4 wherein the application server is a weblogic server and said extensible markup language fie is a weblogic.xml file.

7. The system of claim 1 wherein the pattern matching interface is a Java class defining uniform resource indicator string patterns for use in matching.

8. The system of claim 1 wherein the configuration file is parsed at run-time to determine the particular pattern matching interface that is then plugged into the servlet container at run-time.

9. The method of claim 1 wherein the servlet container which allows the plugin of different pattern matching interfaces is used instead of a hard-code servlet container.

10. A method of allowing pluggable pattern matching in an application server environment, comprising the steps of:
receiving http requests at a servlet container for communication to an application server;
indicating in an XML configuration file a particular pattern matching interface that is selected from a plurality of pattern matching interfaces, wherein the XML configuration file includes a setting that defines the classname of the particular pattern matching interface;

parsing the XML configuration file setting at run-time to determine the particular pattern matching interface;

plugging the particular pattern matching interface into the servlet container;

matching by the servlet container the http requests to a desired pattern using the particular pattern matching interface; and communicating by the servlet container the matched http requests to the application server.

11. The method of claim 10 wherein said http requests are received from a user operating a web browser application.

12. The method of claim 10 wherein said http requests are received from a software application.

13. The method of claim 10 wherein the configuration file is an extensible markup language file containing a plurality of entries defining the configuration of the application server environment.

14. The method of claim 13 wherein the particular pattern matching interface is specified as an entry in the extensible markup language file.

15. The method of claim 13 wherein the application server is a weblogic server and extensible markup language file is a weblogic.xml file.

16. The method of claim 9 wherein the pattern matching interface is a Java class defining uniform resource indicator string patterns for use in matching.

17. The method of claim 10 wherein plugging the particular pattern matching interface into the servlet container further comprises parsing the configuration file at run-time to determine the particular pattern matching interface that is then plugged into the servlet container at run-time.

18. The method of claim 10 wherein receiving requests at a servlet container further comprises using a servlet container which allows plugin of different pattern matching interfaces instead of a hard-code servlet container.

19. A computer-readable medium storage for allowing pluggable pattern matching in an application server environment, comprising:

means for receiving http requests at a servlet container for communication to an application server;

means for indicating in an XML configuration file a particular pattern matching interface that is selected from a plurality of pattern matching interfaces, wherein the XML configuration file includes a setting that defines the classname of the particular pattern matching interface;

means for parsing the XML configuration file setting at run-time to determine the particular pattern matching interface; means for plugging the particular pattern matching interface into the servlet container;

means for matching by the servlet container the http requests to a desired pattern using the particular pattern matching interface; and means for communicating by the servlet container the matched http requests to the application server.

* * * * *